United States Patent
Raghavan et al.

(10) Patent No.: US 10,681,624 B2
(45) Date of Patent: Jun. 9, 2020

(54) STEADY-STATE BEAM SCANNING AND CODEBOOK GENERATION

(71) Applicant: QUALCOMM Incorporated, San Diego, CA (US)

(72) Inventors: Vasanthan Raghavan, West Windsor Township, NJ (US); Jianghong Luo, Skillman, NJ (US); Raghu Narayan Challa, San Diego, CA (US); Qijia Liu, Toronto (CA); Junyi Li, Chester, NJ (US); Alexei Yurievitch Gorokhov, San Diego, CA (US); Assaf Touboul, Netanya (IL)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/557,582

(22) Filed: Aug. 30, 2019

(65) Prior Publication Data

US 2019/0387463 A1  Dec. 19, 2019

Related U.S. Application Data

(63) Continuation of application No. 15/684,861, filed on Aug. 23, 2017, now Pat. No. 10,420,018.

(60) Provisional application No. 62/426,110, filed on Nov. 23, 2016.

(51) Int. Cl.
| | |
|---|---|
| *H04W 48/16* | (2009.01) |
| *H04B 7/06* | (2006.01) |
| *H04B 7/0456* | (2017.01) |
| *H04W 16/28* | (2009.01) |

(52) U.S. Cl.
CPC ......... *H04W 48/16* (2013.01); *H04B 7/0456* (2013.01); *H04B 7/0617* (2013.01); *H04B 7/0639* (2013.01); *H04B 7/0695* (2013.01); *H04W 16/28* (2013.01)

(58) Field of Classification Search
CPC .................................................. H04W 48/05
See application file for complete search history.

(56) References Cited

U.S. PATENT DOCUMENTS

| | | | |
|---|---|---|---|
| 6,701,165 B1 * | 3/2004 | Ho | H04B 7/088 |
| | | | 455/273 |
| 9,536,149 B1 * | 1/2017 | Cesarano | G05D 1/0214 |
| 2005/0221838 A1 * | 10/2005 | Cha | H04B 7/0408 |
| | | | 455/452.2 |

(Continued)

FOREIGN PATENT DOCUMENTS

WO     2016180497 A1    11/2016

OTHER PUBLICATIONS

International Search Report and Written Opinion—PCT/US2017/062357—ISA/EPO—dated Feb. 1, 2018.

*Primary Examiner* — Ernest G Tacsik
(74) *Attorney, Agent, or Firm* — Arent Fox, LLP

(57) ABSTRACT

A method, an apparatus, and a computer-readable medium may be described in the present disclosure. The apparatus may be a user equipment. The apparatus may determine whether a number of unsuccessful repetitions associated with performance of a first type of scanning exceeds a repetition threshold. The apparatus may perform a second type of beam scanning based on the determination that the number of unsuccessful repetitions exceeded the repetition threshold.

40 Claims, 9 Drawing Sheets

(56) References Cited

U.S. PATENT DOCUMENTS

| | | | |
|---|---|---|---|
| 2005/0285803 A1* | 12/2005 | Iacono | H04W 16/24 343/702 |
| 2006/0203789 A1* | 9/2006 | Iacono | H04B 7/0608 370/338 |
| 2009/0005121 A1 | 1/2009 | Wong et al. | |
| 2010/0159845 A1* | 6/2010 | Kaaja | H04B 7/088 455/70 |
| 2010/0190450 A1* | 7/2010 | Stirling-Gallacher | H04B 7/0695 455/67.13 |
| 2010/0210219 A1* | 8/2010 | Stirling-Gallacher | H04B 7/0695 455/67.11 |
| 2010/0290414 A1* | 11/2010 | Yamada | H04W 16/14 370/329 |
| 2011/0051656 A1* | 3/2011 | Hethuin | H04B 7/1555 370/315 |
| 2013/0072189 A1 | 3/2013 | Cheng et al. | |
| 2015/0126194 A1* | 5/2015 | Monteiro da Silva | H04B 7/0617 455/436 |
| 2015/0207552 A1 | 7/2015 | Nammi et al. | |
| 2016/0066197 A1* | 3/2016 | Park | H04W 16/28 370/329 |
| 2016/0262067 A1 | 9/2016 | Hara | |
| 2016/0330780 A1 | 11/2016 | Kim et al. | |
| 2017/0019903 A1 | 1/2017 | Talukdar et al. | |
| 2017/0127398 A1* | 5/2017 | Andgart | H04B 7/0695 |
| 2017/0303265 A1* | 10/2017 | Islam | H04B 7/0695 |
| 2017/0346575 A1 | 11/2017 | Tang et al. | |
| 2017/0347334 A1* | 11/2017 | Akkarakaran | H04B 7/0617 |
| 2018/0146419 A1 | 5/2018 | Raghavan et al. | |

\* cited by examiner

STEADY-STATE BEAM SCANNING AND CODEBOOK GENERATION

CROSS-REFERENCE TO RELATED APPLICATION(S)

This application is a Continuation of U.S. application Ser. No. 15/684,861, entitled "STEADY-STATE BEAM SCANNING AND CODEBOOK GENERATION" and filed on Aug. 23, 2017, which claims the benefit of U.S. Provisional Application Ser. No. 62/426,110, entitled "STEADY-STATE BEAM SCANNING AND CODEBOOK GENERATION" and filed on Nov. 23, 2016. The disclosures of the aforementioned non-provisional and provisional applications are expressly incorporated by reference herein in their entireties.

BACKGROUND

Field

The present disclosure relates generally to communication systems, and more particularly, to a user equipment configured to perform steady-state beam scanning and codebook generation.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Millimeter wave (mmW) systems may be deployed as part of various wireless communications systems, such as 5G NR systems. Such mmW systems may provide relatively high data rates (e.g., relative to LTE communication) and/or provide relatively low latency (e.g., relative to LTE communication). In connection with mmW systems, beamforming may be utilized in order to achieve such relatively high data rates and/or relatively low latencies.

One type of beamforming may include codebook-based beam scanning. A codebook may include information corresponding to a beam used for communication, such as a beam index, direction, beam weights across antennas, antenna ordering information, beam steering information (e.g., angles in azimuth and/or zenith), and/or other information associated with a beam. For example, a codebook may include a collection of beamforming vectors (e.g., fixed and/or predefined beamforming vectors), as well as techniques for generating and/or combining vectors (both static as well as dynamic). Beamforming codebooks can be either designed for rank-1 analog beamforming or for higher rank precoding applications. An example of a codebook may include a matrix of beam weights with different column vectors corresponding to the weights used across different antennas for a certain layer of data transmission.

In various aspects, use of a codebook blindly may increase latency. The beams in a codebook may be evaluated by a wireless device (e.g., a user equipment (UE)) based on channel measurements associated with beams, e.g., each time the UE generates or uses a beam. For example, a UE may perform one or more measurements in order to determine beam indexes and/or directions (e.g., based on pilot or reference signals). Because a wireless device may frequently perform measurements, latency may be increased.

Various issues may affect the determination of the choice of beam(s) from the codebook. For example, paths and/or clusters may be blocked by objects (e.g., other individuals, vehicles, buildings, or even the hand or body of a user). Additionally, new paths/clusters may arrive or disappear as objects move and channel conditions change. Further, beams may drift in time due to the movement of the wireless device, the user, and/or the blockers in the environment, which may affect paths and/or clusters.

With a steady-state approach for determining beams, a wireless device may determine a beam to use for communication based on information associated with beams (e.g., in a codebook). For example, a steady-state approach may include information associated with beams that are prioritized, e.g., so that the wireless device may select a high-priority beam pair for communication. Accordingly, the steady-state approach may allow a wireless device to select or determine a beam (or beam pair) for communication more quickly than if the wireless device were to use a blind approach. In order to generate the beams (e.g., based on a steady-state approach), a wireless device may need to perform one or more measurements associated with one or more beams in order to identify or determine a priority for beams (or beam pairs).

In an aspect of the disclosure, a method, a computer-readable medium, and an apparatus are provided. In various aspects, the apparatus may be a wireless device, such as a UE. The apparatus may determine whether a number of unsuccessful repetitions associated with performance of a first type of beam scanning exceeds a repetition threshold. The apparatus may perform a second type of beam scanning based on the determination that the number of unsuccessful repetitions exceeded the repetition threshold. In an aspect, the performance of the first type of beam scanning and the performance of the second type of beam scanning are based on a codebook. In an aspect, the apparatus may dynamically update the codebook based on current information associated with a serving beam. In an aspect, the number of unsuccessful repetitions has not exceeded the repetition threshold, and the apparatus may measure a first value from the performance of the first type of beam scanning, wherein the first value is associated with a new serving beam, and switch to the new serving beam based on a comparison of the first value and a second value which is associated with a current serving beam. In an aspect, the first value and the second value are based on a signal-to-noise ratio (SNR), a signal-to-interference-plus-noise-ratio (SINR), a signal-to-noise-plus-distortion ratio (SNDR), a received signal strength indicator (RSSI), a reference signal received power (RSRP), or a beam reference signal received quality (B-RSRP), or any combination thereof. In an aspect, the apparatus may determine to perform the first type of beam scanning before the second type of beam scanning. In an aspect, the determination to perform the first type of beam scanning before the second type of beam scanning is based on a timescale associated with the first type of beam scanning. In an aspect, the apparatus may determine the repetition threshold based on the timescale. In an aspect, the timescale is determined based on at least one of a mobility of the UE, an orientation of the UE relative to a cluster arrival angle and a carrier frequency, output data from at least one sensor associated with the UE, data from a cloud-based server, or data from a base station. In an aspect, the data from the base station or the data from the cloud-based server includes at least one of a sequence of beams from which the UE determines beam coherence, information about an environment proximate to the UE, or a value associated with the timescale. In an aspect, the first type of beam scanning includes beam refinement using a first set of directional beams associated with a first subarray, the first subarray corresponding to use of a current serving beam, and wherein the second type of beam scanning includes beam scanning using a pseudo-omni beam associated with a second subarray that is different from the first subarray. In an aspect, the first type of beam scanning includes beam scanning using a pseudo-omni beam associated with a second subarray that is different from a first subarray, the first subarray corresponding to use of a current serving beam, and wherein the second type of beam scanning includes beam refinement using a first set of directional beams associated with the first subarray.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
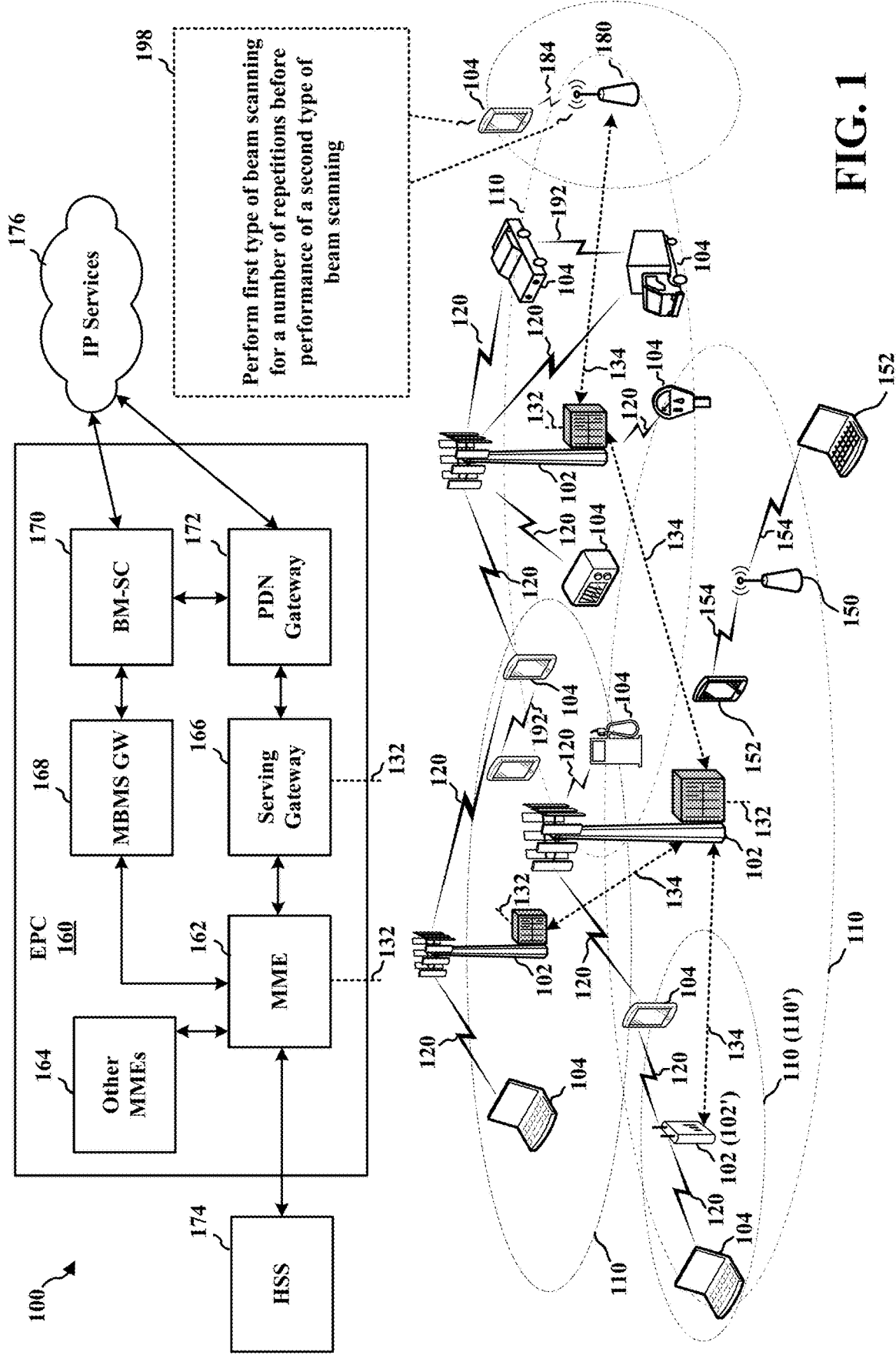
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, and an Evolved Packet Core (EPC) 160. The base stations 102 may include macro cells (high power cellular base station) and/or small cells (low power cellular base station). The macro cells include base stations. The small cells include femtocells, picocells, and microcells.

The base stations 102 (collectively referred to as Evolved Universal Mobile Telecommunications System (UMTS) Terrestrial Radio Access Network (E-UTRAN)) interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 192. The D2D communication link 192 may use the DL/UL WWAN spectrum. The D2D communication link 192 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

The gNodeB (gNB) 180 may operate in millimeter wave (mmW) frequencies and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 184 with the UE 104 to compensate for the extremely high path loss and short range.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a gNB, Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the EPC 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a toaster, or any other similar functioning device. Some of the UEs 104 may be referred to as IoT devices (e.g., parking meter, gas pump, toaster, vehicles, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may be configured to perform at least two types of beam scanning. A first type of beam scanning may include beam refinement using a first set of directional beams associated with a first subarray of the UE 104, and the first subarray may correspond to use of a current serving beam. In an aspect, this first type of beam scanning may be referred to as serving-subarray scanning. A second type of beam scanning may include beam scanning using a pseudo-omni beam associated with a second subarray of the UE 104. In an aspect, this second type of beam scanning may be referred as alternate-subarray scanning.

In various aspects, the UE 104 may determine whether to perform a first type of beam scanning (e.g., serving-subarray scanning) before a second type of beam scanning (e.g., alternate-subarray scanning). That is, the UE 104 may prioritize a first type of beam scanning over a second type of beam scanning. For example, the UE 104 may prioritize serving-subarray scanning over alternate-subarray scanning, or vice versa (e.g., alternate-subarray scanning may be prioritized over serving-subarray beam scanning).

In one aspect, the UE 104 may determine to perform the first type of beam scanning over the second type of beam scanning based on a timescale associated with the first type of beam scanning. The timescale may correspond to a duration for which a current serving beam is expected to remain coherent (e.g., there is not radio link failure, channel quality measurement(s) satisfy a threshold, etc.). For example, the timescale may indicate a duration for which the current serving beam is estimated to provide satisfactory communication with the base station 102.

According to various aspects, the UE 104 may determine the timescale based on one or more of a mobility of the UE 104, an orientation of the UE 104 relative to a cluster arrival angle and/or a carrier frequency, output data from at least one sensor associated with the UE 104 (e.g., an accelerometer, a gyroscope, etc.), data from the base station 102, and/or data from a cloud-based server. In one aspect, the UE 104 may receive, from the base station 102, a sequence of beams from which the UE 104 may determine beam coherence. The UE 104 may determine the timescale based on the sequence of beams (e.g., based on tracking the beams of the sequence). In another aspect, the UE 104 may receive (e.g., from the base station 102 and/or a cloud-based server), a value associated with the timescale, such as a seed value from which the UE 104 may determine the timescale.

In addition to the determination of the prioritization of beam scanning, the UE 104 may determine a repetition threshold. The repetition threshold may indicate a number of repetitions that the UE 104 is to perform the first type of beam scanning before performing the second type of beam scanning. In one aspect, the UE 104 may determine the repetition threshold based on a timescale. For example, a lower or shorter timescale (e.g., for a UE with a relatively high mobility), the repetition threshold may be correspondingly lower relative to a higher or longer timescale (e.g., for a UE with a relatively low mobility).

In order to find a better serving beam, the UE 104 may perform 198 the first type of beam scanning. The UE 104 may perform 198 the first type of beam scanning based on a steady-state approach and, further, may dynamically update a codebook as the UE 104 performs 198 the first type of beam scanning. If the UE 104 is able to find a better beam (e.g., a beam that offers more coherence than the current serving beam) when performing 198 the first type of beam scanning, the UE 104 may switch to the new beam, which becomes the current serving beam.

In an effort to find a better beam, the UE 104 may repeatedly perform 198 the first type of beam scanning until the repetition threshold is reached. If the UE 104 is unable to find a better beam than the current serving beam based on performing 198 the first type of beam scanning, the UE 104 may then perform 198 the second type of beam scanning. For example, the UE 104 may perform 198 serving-subarray scanning until the repetition threshold is reached (e.g., four repetitions of serving-subarray scanning) and, if the UE 104 is unable to find a better beam using the serving subarray, then the UE 104 may perform 198 alternate-subarray scanning in order to determine if the UE 104 may use a better beam that corresponds to an alternate subarray. The UE 104 may perform 198 the second type of beam scanning based on the codebook and, further, may dynamically update the codebook as the UE 104 performs 198 the second type of beam scanning. In this way, the UE 104 may determine a current serving beam, which may offer satisfactory coherence and/or may be estimated to remain coherent for a satisfactory duration.

Figure 2:
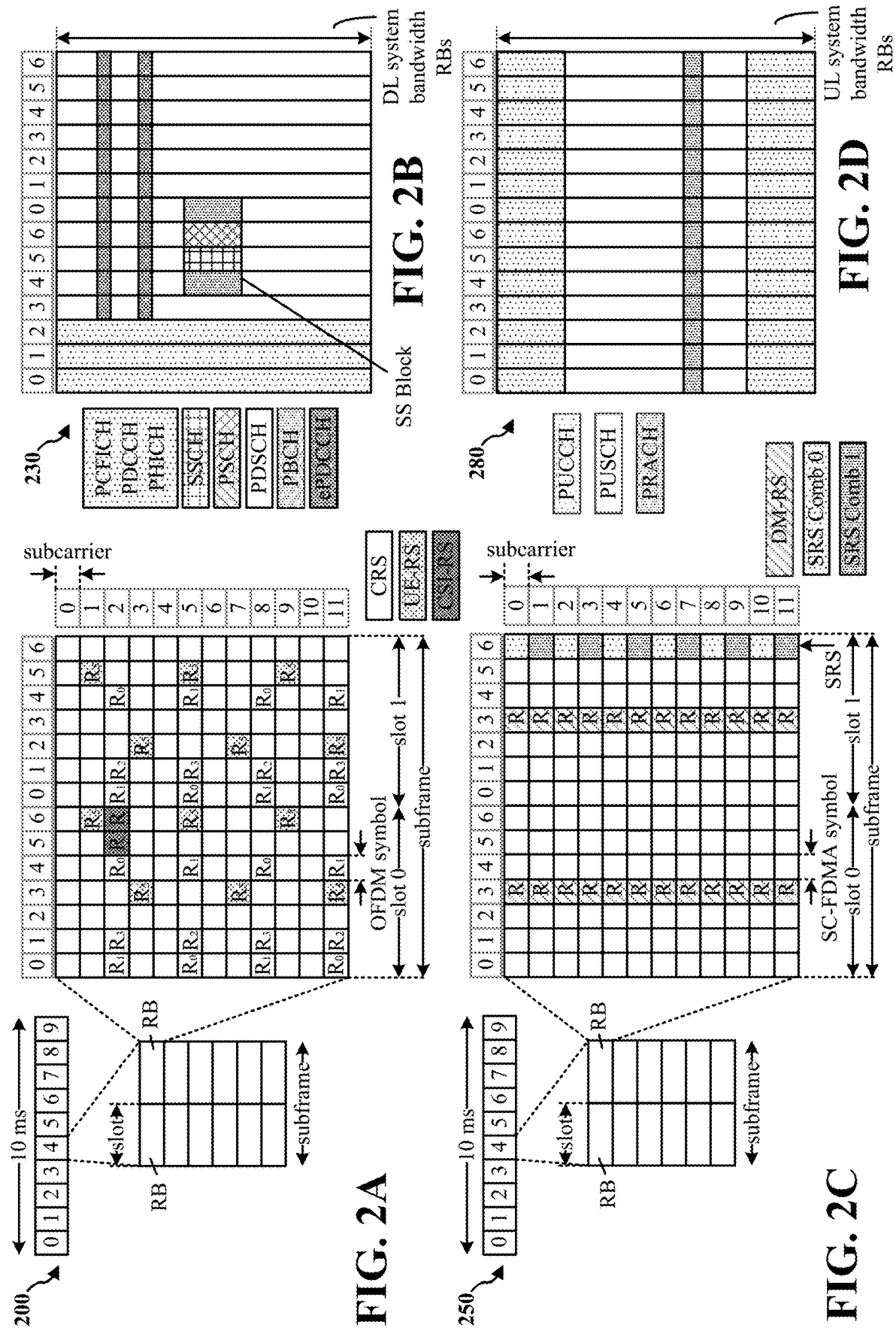
FIGS. 2A, 2B, 2C, and 2D are diagrams illustrating examples of a DL frame structure, DL channels within the DL frame structure, an UL frame structure, and UL channels within the UL frame structure, respectively.

FIG. 2A is a diagram 200 illustrating an example of a DL frame structure. FIG. 2B is a diagram 230 illustrating an example of channels within the DL frame structure. FIG. 2C is a diagram 250 illustrating an example of an UL frame structure. FIG. 2D is a diagram 280 illustrating an example of channels within the UL frame structure. Other wireless communication technologies may have a different frame structure and/or different channels. A frame (10 ms) may be divided into 10 equally sized subframes. Each subframe may include two consecutive time slots. A resource grid may be used to represent the two time slots, each time slot including one or more time concurrent resource blocks (RBs) (also referred to as physical RBs (PRBs)). The resource grid is divided into multiple resource elements (REs). For a normal cyclic prefix, an RB may contain 12 consecutive subcarriers in the frequency domain and 7 consecutive symbols (for DL, OFDM symbols; for UL, SC-FDMA symbols) in the time domain, for a total of 84 REs. For an extended cyclic prefix, an RB may contain 12 consecutive subcarriers in the frequency domain and 6 consecutive symbols in the time domain, for a total of 72 REs. The number of bits carried by each RE depends on the modulation scheme.

As illustrated in FIG. 2A, some of the REs carry DL reference (pilot) signals (DL-RS) for channel estimation at the UE. The DL-RS may include cell-specific reference signals (CRS) (also sometimes called common RS), UE-specific reference signals (UE-RS), and channel state information reference signals (CSI-RS). FIG. 2A illustrates CRS for antenna ports 0, 1, 2, and 3 (indicated as $R_0$, $R_1$, $R_2$, and $R_3$, respectively), UE-RS for antenna port 5 (indicated as $R_5$), and CSI-RS for antenna port 15 (indicated as R).

FIG. 2B illustrates an example of various channels within a DL subframe of a frame. The physical control format indicator channel (PCFICH) is within symbol 0 of slot 0, and carries a control format indicator (CFI) that indicates whether the physical downlink control channel (PDCCH) occupies 1, 2, or 3 symbols (FIG. 2B illustrates a PDCCH that occupies 3 symbols). The PDCCH carries downlink control information (DCI) within one or more control channel elements (CCEs), each CCE including nine RE groups (REGs), each REG including four consecutive REs in an OFDM symbol. A UE may be configured with a UE-specific enhanced PDCCH (ePDCCH) that also carries DCI. The ePDCCH may have 2, 4, or 8 RB pairs (FIG. 2B shows two RB pairs, each subset including one RB pair). The physical hybrid automatic repeat request (ARQ) (HARQ) indicator channel (PHICH) is also within symbol 0 of slot 0 and carries the HARQ indicator (HI) that indicates HARQ acknowledgement (ACK)/negative ACK (NACK) feedback based on the physical uplink shared channel (PUSCH). The primary synchronization channel (PSCH) may be within symbol 6 of slot 0 within subframes 0 and 5 of a frame. The PSCH carries a primary synchronization signal (PSS) that is used by a UE 104 to determine subframe/symbol timing and a physical layer identity. The secondary synchronization channel (SSCH) may be within symbol 5 of slot 0 within subframes 0 and 5 of a frame. The SSCH carries a secondary synchronization signal (SSS) that is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DL-RS. The physical broadcast channel (PBCH), which carries a master information block (MIB), may be logically grouped with the PSCH and SSCH to form a synchronization signal (SS) block. The MIB provides a number of RBs in the DL system bandwidth, a PHICH configuration, and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry demodulation reference signals (DM-RS) for channel estimation at the base station. The UE may additionally transmit sounding reference signals (SRS) in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various channels within an UL subframe of a frame. A physical random access channel (PRACH) may be within one or more subframes within a frame based on the PRACH configuration. The PRACH may include six consecutive RB pairs within a subframe. The PRACH allows the UE to perform initial system access and achieve UL synchronization. A physical uplink control channel (PUCCH) may be located on edges of the UL system bandwidth. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
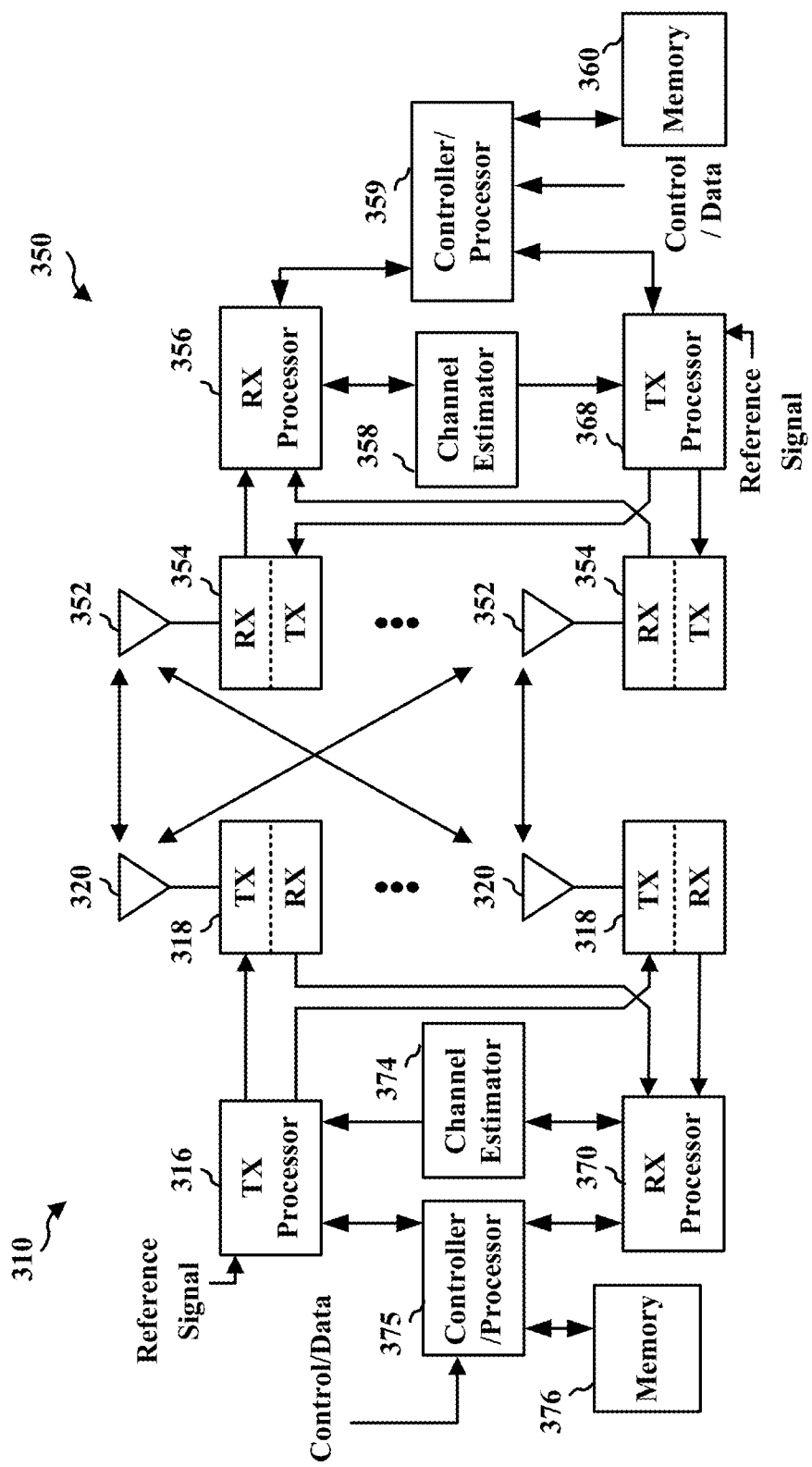
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

Figure 4:
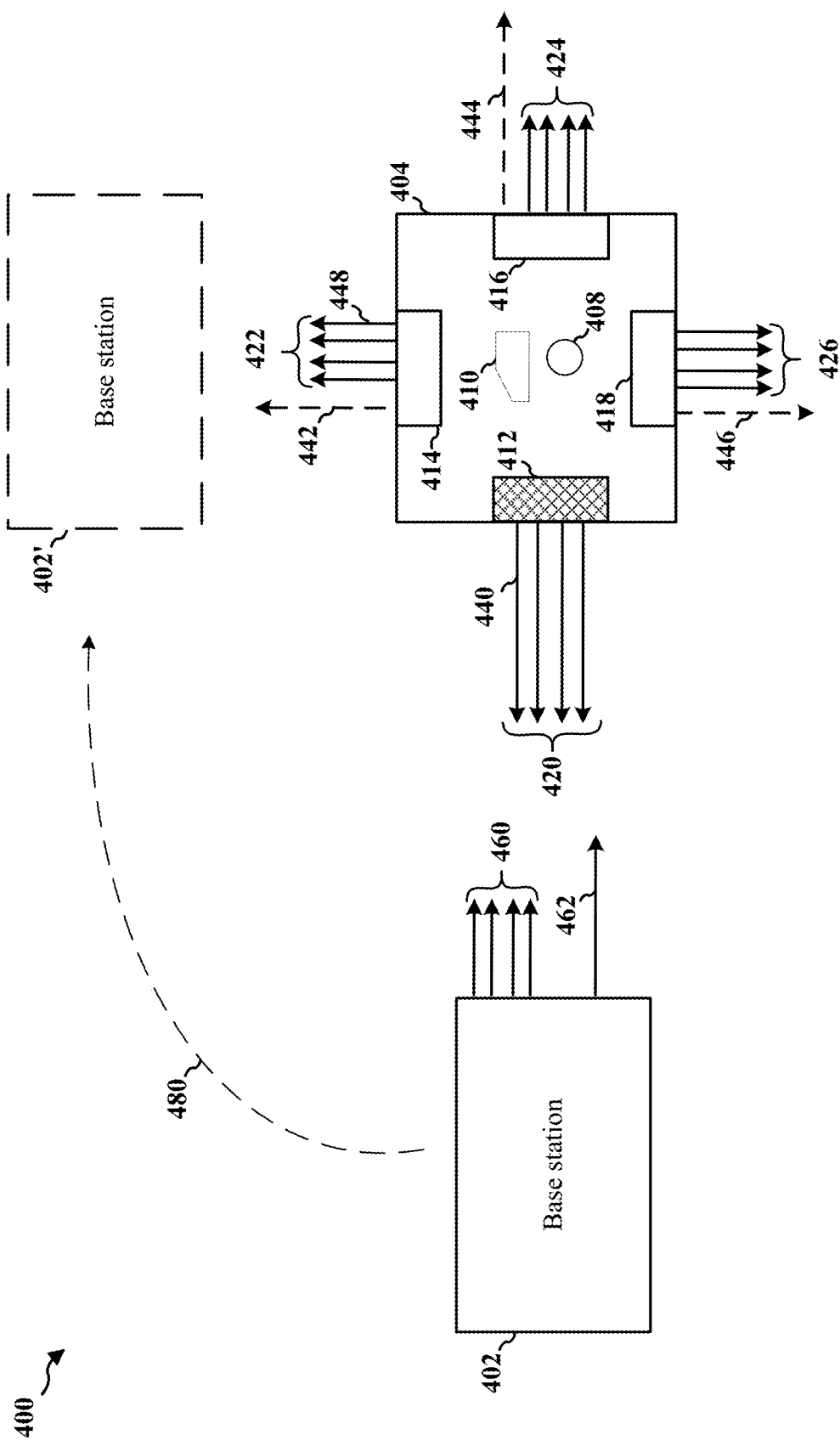
FIG. 4 is a diagram of a wireless communications system.

FIG. 4 is a diagram of a wireless communications system 400. The wireless communications system 400 may include a base station 402 and a UE 404. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave (mmW). Near mmW may extend down to a frequency of 3 GHz with a wavelength of 100 millimeters (the super high frequency (SHF) band extends between 3 GHz and 30 GHz, also referred to as centimeter wave). While the disclosure herein references mmWs, it should be understood that the disclosure also applies to near mmWs. Further, while the disclosure herein refers to mmW base stations, it should be understood that the disclosure also applies to near mmW base stations. The millimeter wavelength RF channel has extremely high path loss and a short range.

Aspects described herein (e.g., mmW systems) may be deployed as part of a 5G NR system. The mmW systems may offer relatively high data rates at relatively low latencies (e.g., compared to LTE systems). In order to build a useful communication network in the millimeter wavelength spectrum, a beamforming technique may be used, for example, to compensate for the extreme high path loss. The beamforming technique focuses the RF energy into a narrow direction to allow the RF beam to propagate farther in that direction. Using the beamforming technique, non-line of sight (NLOS) RF communication in the millimeter wavelength spectrum may rely on reflection and/or diffraction of the beams to reach the UE 404. However, paths and/or clusters between the UE 404 and the base station 402 may become blocked and new paths and/or clusters may become available (e.g., as obstacles, blockers, etc. no longer disrupt a path and/or cluster).

If a path/cluster becomes blocked, either because of movement or changes in the environment (e.g., obstacles, humidity, rain, etc.), a current serving beam used by the UE 404 may become incoherent (e.g., a radio link failure may occur, a channel estimate or measurement may fail to satisfy a threshold, etc.). Thus, in order to provide continuous, seamless coverage for the UE 404, multiple beams in many different directions may be used. To that end, the UE 404 may include a plurality of subarrays 412, 414, 416, 418. Each subarray of the subarrays 412, 414, 416, 418 may correspond to the use of a respective plurality of beams 420, 422, 424, 426. While the present disclosure illustrates four subarrays, and each subarray corresponds to the use of four beams, a UE may include any number of subarrays, and each subarray may correspond to the use of any number of beams.

One beamforming technique may include codebook-based beam scanning. A codebook may include a collection of beamforming vectors (e.g., fixed and/or predefined beamforming vectors), as well as techniques for combining vectors. Blind codebook-based scanning may increase the latency commensurate with beam switching. With blind codebook-based scanning, a UE may lack information indicating a preferable beam or direction and, therefore, the UE may need to measure respective beam qualities for a plurality of beams at a plurality of subarrays in order to identify and select a preferable beam.

Thus, UEs may benefit from generation of a codebook. For example, the UE 404 may include a codebook 410, which may based on a steady-state approach, and the UE 404 may dynamically update the codebook when performing beam scanning. A codebook may include information indicating beamforming vectors (e.g., fixed and/or predefined beamforming vectors), as well as techniques for combining vectors, so that the UE 404 may prioritize certain beams over others and may refrain from using one or more beams altogether (e.g., because information in the codebook indicates that such beams are incoherent, blocked, etc.).

In the illustrated aspect, the UE 404 may include a serving subarray 412. The UE 404 may communicate with the base station 402 using a current serving beam 440, which corresponds to the serving subarray 412. The UE 404 may be configured to use other directional beams of the set of beams 420 of the serving subarray 412. Further, the UE 404 may be configured to switch to a new beam of an alternate subarray, for example, when the new beam is more coherent (e.g., offers higher channel quality) than the current serving beam 440. For example, the UE 404 may switch to a new beam of the set of beams 422 corresponding to the first alternate subarray 414 (e.g., when the UE 404 moves 480 relative to the base station 402, and the base station 402 becomes base station 402' from the perspective of the UE 404). In various aspects, the UE 404 may benefit from subarray diversity, as different subarrays may cover different regions, thereby diversifying coherence with respect to paths/clusters.

If the UE 404 is a low-mobility UE, such as a customer-premises equipment (CPE), beam coherence may not frequently change relatively to a subframe duration. That is, beams may drift in time, but the timescale may be estimated to be larger or longer than that of a high-mobility UE.

If the UE 404 is a high-mobility UE, beam coherence may change more frequently relative to the subframe duration. Regardless of UE mobility, arrival and/or blockage of paths/clusters may affect beam coherence. The arrival/blockage of paths/clusters may be random and, therefore, not a priori predictable, but the UE 404 may be configured to estimate a timescale, either autonomously or with the help of another system (e.g., the base station 402 and/or a cloud-based server).

The UE 404 may be configured to perform both serving-subarray scanning and alternate-subarray scanning. One or both of these beam scanning procedures may run in the background at the UE 404 (e.g., the UE 404 may continue to communicate using a current serving beam 440 while contemporaneously performing the first and/or second type of beam scanning). Moreover, one or both of these scanning procedures may seek neighboring cells provided by neighboring base stations.

The serving-subarray beam scanning may include beam scanning using the set of directional beams 420 corresponding to the serving subarray 412. For example, serving-subarray beam scanning may include beam refinement using the set of directional beams 420 corresponding to the serving subarray 412. In an aspect, the UE 404 may perform the serving-subarray beam scanning based on the codebook 410. For example, the UE 404 may select beamforming vectors for directional beams of the serving subarray based on information indicated in the codebook 410.

The alternate-subarray scanning may include scanning using a respective pseudo-omni beam 442, 444, 446 of a respective alternate subarray 414, 416, 418. A pseudo-omni beam may be a beam with a relatively flat gain in a certain coverage area, which may allow the UE 404 to determine if a directional beam of alternate subarray is more coherent. However, the UE 404 may still perform beam refinement to select a beam of a set of directional beams after determining to switch to an alternate subarray. The UE 404 may attempt to minimize across-module processing (e.g., beam/subarray pairing) as much as possible. During beam refinement across an alternate subarray 414, 416, 418, the UE 404 may use the codebook 410. For example, the UE 404 may select beamforming vectors for directional beams of an alternate subarray based on information indicated in the codebook 410.

In various aspects, the UE 404 may determine whether to perform a first type of beam scanning (e.g., serving-subarray scanning) before a second type of beam scanning (e.g., alternate-subarray scanning). That is, the UE 404 may prioritize a first type of beam scanning over a second type of beam scanning. For example, the UE 404 may prioritize serving-subarray scanning over alternate-subarray scanning, or vice versa.

In one aspect, the UE 404 may determine to perform the first type of beam scanning over the second type of beam scanning based on a timescale associated with the first type of beam scanning. The timescale may correspond to a duration for which a current serving beam is expected or estimated to remain coherent. For example, the timescale may indicate a duration for which the current serving beam 440 is estimated to provide satisfactory communication with the base station 402. When the timescale is relatively larger, then the UE 404 may prioritize the first type of beam scanning (e.g., serving-subarray scanning). However, when the timescale is relatively smaller, then the UE 404 may prioritize the second type of beam scanning (e.g., alternate-subarray scanning). In an aspect, the UE 404 may determine the relative size of the timescale by comparing the timescale to a threshold—e.g., the UE 404 may determine that the timescale is relatively large when the timescale meets or exceeds a threshold, but may determine that the timescale is relatively small when the timescale does not meet the threshold.

In one aspect, beam coherence may be based on one or more of a signal-to-noise ratio (SNR), a signal-to-interference-plus-noise-ratio (SINR), a signal-to-noise-plus-distortion ratio (SNDR), a received signal strength indicator (RSSI), a reference signal received power (RSRP), a reference signal received quality (RSRQ), a beam reference signal received power (B-RSRP), or a beam reference signal received quality (B-RSRQ). or any combination thereof. For example, the UE 404 may measure, using a beam (e.g., the current serving beam 440), at least one value for an SNR, SINR, SNDR, RSSI, RSRP, RSRQ, B-RSRP, and/or B-RSRQ and compare the at least one measured value to a threshold. If the at least one measured value satisfies the threshold (e.g., meets or exceeds the threshold), then the UE 404 may determine that the corresponding beam is coherent or satisfactory. Correspondingly, the UE 404 may determine that the corresponding beam is incoherent or satisfactory when the at least one measured value does not satisfy the threshold (e.g., fails to meet or exceed the threshold).

According to various aspects, the UE 404 may determine the timescale based on one or more of a mobility of the UE 404, an orientation of the UE 404 relative to a cluster arrival angle and/or a carrier frequency, output data from at least one sensor 408 associated with the UE 404 (e.g., an accelerometer, a gyroscope, etc.), and/or one or more measurements based on the set of directional beams 420 corresponding to the serving subarray 412 and/or a respective pseudo-omni beam 442, 444, 446 corresponding to a respective alternate subarray 414, 416, 418.

In one aspect, the UE 404 may determine a value for a measurement based on at least one of an SNR, an SINR, an SNDR, an RSSI, an RSRP, a B-RSRP, and/or a B-RSRQ, and/or any combination thereof. For example, the UE 404 may measure a change in coherence (e.g., a change in values measured over time for one of an SNR, an SINR, an SNDR, an RSSI, an RSRP, a B-RSRP, and/or a B-RSRQ). The UE 404 may calculate the timescale based on the change in coherence (e.g., the UE 404 may use a relatively larger timescale when the change in coherence is relatively small).

In one aspect, the UE 404 may adjust the timescale based on output from the at least one sensor 408. For example, if output from the sensor 408 indicates that the UE 404 is frequently moving (e.g., rotating, accelerating, etc.), then the UE 404 may reduce the timescale, e.g., because the time that the current serving beam 440 is expected to remain coherent may be reduced.

In one aspect, the UE 404 may determine the timescale based on data 462 from the base station 402 and/or data from a cloud-based server (e.g., similar to the data 462 from the base station 402). For example, the UE 404 may receive (e.g., from the base station 402 and/or a cloud-based server), a value associated with the timescale, such as a seed value from which the UE 404 may determine the timescale. The UE 404 may use the seed value in connection with a predetermined algorithm in order to calculate the timescale.

In another example, the UE 404 may receive (e.g., from the base station 402 and/or a cloud-based server) information associated with an environment proximate to the UE 404, such as information indicating the availability of paths/clusters proximate to the UE 404. For example, the base station 402 may record information associated with paths/clusters of one or more other UEs served by the base station 402, such as one or more beam switches by another UE, which may indicate the arrival and/or disappearance of objects that affect paths/clusters. The base station 402 may provide this recorded information to the UE 404 as the data 462. Based on the data 462 indicating information associated with the environment proximate to the UE 404, the UE 404 may determine (e.g., calculate) the timescale.

In one aspect, the UE 404 may receive, from the base station 402, a sequence of beams 460 from which the UE 404 may determine beam coherence. The UE 404 may determine the timescale based on the sequence of beams 460 (e.g., based on tracking the beams of the sequence). For example, the UE 404 may receive a sequence of beams from the base station 402, and the UE 404 may measure one or more values (e.g., RSSI value) based on the sequence of beams. Based on the measured one or more values, the UE 404 may determine a beam coherence of one or more beams (e.g., change in coherence of the current serving beam 440). When the beam coherence frequently changes, the UE 404 may determine that a smaller or shorter timescale should be used.

In addition to the determination of the prioritization of beam scanning (e.g., serving-subarray scanning over alternate-subarray scanning, or vice versa), the UE 404 may determine a repetition threshold. The repetition threshold may indicate a number of repetitions that the UE 404 is to perform of the first type of beam scanning before performing the second type of beam scanning. For example, the UE 404 may be a high-mobility UE and, therefore, the orientation of the UE 404 with respect to the base station 402 may change relatively frequently. Because of this high mobility, the UE 404 may benefit from performing alternate-subarray scanning before serving-subarray scanning, since the probability that an alternate subarray may offer a better beam than the current serving beam 440 may be greater than the probability that the serving subarray 412 offers a better beam.

In another example, the UE 404 may be a low-mobility UE (e.g., a CPE), which may infrequently change orientation (e.g., a CPE may be at a fixed location). Because of this low mobility, the UE 404 may benefit from performing serving-subarray scanning before alternate-subarray scanning, since the probability that an alternate subarray may offer a better beam than the current serving beam 440 may be less than the probability that the serving subarray 412 offers a better beam.

In one aspect, the UE 404 may determine the repetition threshold based on the timescale. For example, the UE 404 may increase the repetition threshold as the timescale increases. Correspondingly, the UE 404 may decrease the repetition threshold as the timescale decreases. Illustratively, the shorter the timescale (e.g., the shorter the amount of time a beam is estimated to remain coherent), the more likely the UE 404 may identify a better beam using another type of beam scanning.

The UE 404 may be configured to determine a plurality of timescales. For example, the UE 404 may determine a first timescale associated with the serving subarray 412 (e.g., a first timescale that indicates a duration for which the current serving beam 440 of the set of directional beams 420 is estimated to remain coherent before another directional beam of the set of directional beams 420 becomes more coherent). Similarly, the UE 404 may determine a second timescale associated with the alternate subarrays 414, 416, 418 (e.g., a second timescale that indicates a duration for which the set of directional beams 420 includes at least one coherent beam, and after which the UE 404 may use a beam from an alternate subarray 414, 416, 418 that may offer better coherence).

The UE 404 may determine the repetition threshold based on comparison of the first and second timescales. For example, if the first timescale and the second timescale are relatively close, then fewer repetitions of the first type of beam scanning may be beneficial before performing the second type of beam scanning (e.g., the repetition threshold could be one, if the timescales are approximately the same). Alternatively, if the first timescale and the second timescale are appreciably different, then the UE 404 may benefit from performing several repetitions of the first type of beam scanning before performing the second type of beam scanning.

In order to find a better beam, the UE 404 may perform the first type of beam scanning. The UE 404 may perform the first type of beam scanning based on codebook 410. The UE 404 may dynamically update the codebook 410 as the UE 404 performs the first type of beam scanning (e.g., the UE 404 may update information associated with one or more beams, such as beamforming vectors, as the UE 404 scans through the one or more beams). If the UE 404 is able to find a better beam (e.g., a beam that offers better coherence than the current serving beam 440) when performing the first type of beam scanning, the UE 404 may switch to the new beam, which becomes the current serving beam.

The UE 404 may repeatedly perform the first type of beam scanning until the repetition threshold is reached. That is, the UE 404 may determine whether a number of unsuccessful repetitions associated with performance of the first type of beam scanning exceeds the repetition threshold (e.g., an unsuccessful repetition of the first type of beam scanning may include performing the first type of beam scanning without finding a beam that offers better coherence than the current serving beam). If the UE 404 is unable to find a better beam based on performing the first type of beam scanning, the UE 404 may then perform the second type of beam scanning. That is, the UE 404 may perform the second type of beam scanning based on the determination that the number of unsuccessful repetitions meets or exceeds the repetition threshold.

For example, the UE 404 may perform serving-subarray scanning until the repetition threshold is reached (e.g., four repetitions of serving-subarray scanning) and, if the UE 404 is unable to find a better beam using the serving subarray 412, then the UE 404 may perform alternate-subarray scanning in order to determine if the UE 404 may use a better beam that corresponds to one of the alternate subarrays 414, 416, 418. The UE 404 may perform the second type of beam scanning based on the codebook 410 and, further, may dynamically update the codebook 410 as the UE 404 performs the second type of beam scanning.

In order to determine whether the UE 404 should switch from the current serving beam 440 to a new serving beam and/or update the codebook 410, the UE 404 may measure one or more values (e.g., an SNR, an SINR, an SNDR, an RSSI, an RSRP, a B-RSRP, and/or a B-RSRQ) based on the first type of beam scanning or the second type of beam scanning. In an aspect, the UE 404 may measure a first value based on performance of the first type of beam scanning. The first value may be associated with a new serving beam (e.g., another beam of the set of directional beams 420, the new beam 448, etc.). The UE 404 may compare the first value to a second value that is associated with the current serving beam 440. According to various aspects, the first value and the second value may be based on an SNR, an SINR, an SNDR, an RSSI, an RSRP, a B-RSRP, and/or a B-RSRQ, or any combination thereof.

If the UE 404 determines that a new serving beam is more coherent than the current serving beam 440, then the UE 404 may switch to the new serving beam. In one aspect, the UE 404 may determine that the new serving beam is more coherent than the current serving beam 440 based on comparison of the first value to the second value.

By way of example, the UE 404 may communicate with the base station 402 using the current serving beam 440. The UE 404 may determine one or more timescales and, based on the time scales, may determine that alternate-subarray scanning is to be prioritized over serving-subarray scanning. Further, the UE 404 may determine (e.g., based on the determined one or more timescales) that alternate-subarray scanning should be repeated twice before performing serving-subarray scanning (e.g., the UE 404 may determine the repetition threshold to be two).

Further to this example, the UE 404 may move 480 relative to the base station 402, so that the UE 404 is orientated toward the base station 402'. The UE 404 may perform a first repetition of the alternate-subarray scanning (e.g., while the UE 404 is moving 480), but may be unsuccessful in determining that a pseudo-omni beam 442, 444, 446 indicates an alternate subarray 414, 416, 418 offers a better beam.

Therefore, the UE 404 may perform a second repetition of the alternate-subarray scanning (e.g., after the move 480, so that the UE 404 is orientated toward the base station 402'). During this second repetition of alternate-subarray scanning, the UE 404 may determine that a first pseudo-omni beam 442 associated with a first alternate subarray 414 indicates that the first alternate subarray 414 may offer a beam with better coherence (e.g., the UE 404 may detect that the energy associated with the first pseudo-omni beam is above a threshold). Therefore, the UE 404 may perform beam refinement using the set of directional beams 422 corresponding to the first alternate subarray 414. Based on the beam refinement, the UE 404 may switch to a new serving beam 448 in order to communicate with the base station 402'.

If the UE 404 is unable to determine to switch to a new serving beam after repeatedly performing the alternate-subarray scanning until the repetition threshold is reached, then the UE 404 may perform serving-subarray scanning. With serving-subarray scanning, the UE 404 may perform beam refinement using the set of beams 420 corresponding to the serving subarray.

Figure 5:
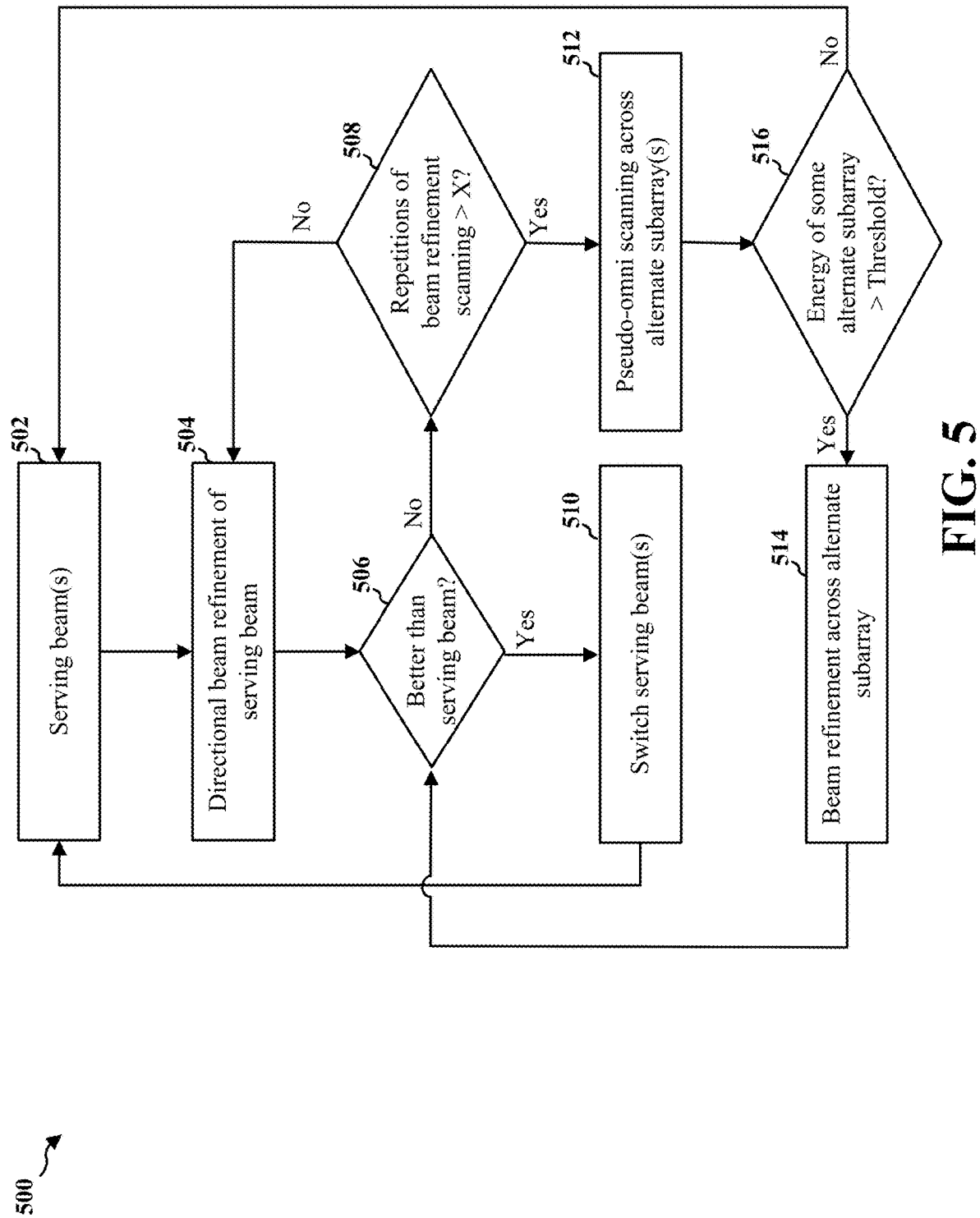
FIG. 5 is a flowchart of a method of wireless communication.

FIG. 5 illustrates a flowchart of a method of wireless communication. The method may be performed by a UE (e.g., the UE 404, the apparatus 802/802'). FIG. 5 may illustrate an approach in which serving-subarray scanning is prioritized over alternate-subarray scanning.

At operation 502, the UE may use one or more serving beams, including at least a current serving beam. For example, the UE may send (and encode) and/or receive (and decode) signals through one or more beams. In the context of FIG. 4, the UE 404 may use the current serving beam 440, for example, to communicate with the base station 402.

At operation 504, the UE may perform directional beam refinement, for example, using beams at a serving subarray of the UE. For example, the UE may measure a respective value associated with a respective beam (e.g., an SNR, an SINR, an SNDR, an RSSI, an RSRP, a B-RSRP, and/or a B-RSRQ) and the UE may select a beam having a best or highest corresponding measured value. In the context of FIG. 4, the UE 404 may perform directional beam refinement using the set of beams 420 corresponding to the serving subarray 412.

At operation 506, the UE may determine whether another directional beam corresponding to the serving subarray is better than the serving beam. For example, the UE may compare a first value measured for another directional beam to a second value measured for the current serving beam and the UE may determine whether the other directional beam offers better coherence than the current serving beam—e.g., the UE may determine that the other directional beam offers better coherence than the current serving beam when the UE determines that the first value exceeds the second value. In the context of FIG. 4, the UE 404 may determine whether another directional beam of the set of directional beams 420 is better than the current serving beam 440.

If another directional beam is better than the current serving beam, then the UE may switch to the other directional beam, as illustrated at operation 510. For example, the UE may adjust a beamforming vector to correspond to the other directional beam and the UE may communicate through the other directional beam. The UE may then return to operation 502 to use the new serving beam. In the context of FIG. 4, the UE 404 may switch to another directional beam of the set of directional beams 420.

If the UE is unable to determine a better serving beam based on directional beam refinement at the serving subarray, the UE may determine whether a number of repetitions of beam refinement scanning (i.e., serving-subarray scanning) exceeds a repetition threshold X, as illustrated at operation 508. For example, the UE may determine that no other directional beams of the serving subarray offer better coherence than the current serving beam after a number of repetitions of the serving-subarray scanning, and the UE may compare the number of times the UE has performed the serving-subarray scanning to a repetition threshold X. In the context of FIG. 4, the UE 404 may determine whether a number of repetitions of serving-subarray scanning using the serving subarray 412 exceeds a repetition threshold.

If the number of repetitions does not exceed the repetition threshold X, then the UE may return to operation 504 to perform a next repetition. In the context of FIG. 4, the UE 404 may perform another repetition of serving-subarray scanning.

If the number of repetitions of serving-subarray scanning (e.g., without identifying a beam that offers better coherence) exceeds the repetition threshold X, then the UE may proceed to operation 512. At operation 512, the UE may perform pseudo-omni scanning across one or more alternate subarrays. For example, the UE may select a pseudo-omni beam of an alternate subarray and measure a value indicating energy detected for the selected pseudo-omni beam. In the context of FIG. 4, the UE 404 may perform alternate-subarray scanning across one or more of the alternate subarrays 414, 416, 418.

At operation 516, the UE may determine whether the energy associated with a pseudo-omni beam corresponding to an alternate subarray exceeds a threshold. For example, the UE may compare the measured value indicating energy to a threshold, and the UE may determine whether the measured value indicating energy satisfies the threshold (e.g., meets or exceeds the threshold). In the context of FIG. 4, the UE 404 may determine whether the energy associated with a pseudo-omni beam (e.g., the first pseudo-omni beam 442) exceeds a threshold.

If the UE determines that the energy associated with one or more pseudo-omni beams across one or more alternate subarrays does not exceed a threshold, then the UE may return to operation 502 to continue communicating with the current serving beam. In the context of FIG. 4, the UE 404 may determine that the respective energies associated with the pseudo-omni beams 442, 444, 446 does not exceed a threshold and, therefore, the UE 404 may continue to communicate using the current serving beam 440.

If the UE determines that the energy associated with one or more pseudo-omni beams across one or more alternate subarrays exceeds a threshold, then the UE may perform beam refinement across the alternate subarray associated with the pseudo-omni beam having the energy exceeding the threshold (e.g., the alternate subarray associated with the pseudo-omni beam having a highest value indicating energy), as illustrated at operation 514. For example, the UE may measure a respective value (e.g., an SNR, an SINR, an SNDR, an RSSI, an RSRP, a B-RSRP, and/or a B-RSRQ) for each directional beam of the alternate subarray, and then select the directional beam of the alternate subarray having the highest or best measured value. In the context of FIG. 4, the UE 404 may perform beam refinement across an alternate subarray (e.g., the first alternate subarray 414) associated with the pseudo-omni beam (e.g., the first pseudo-omni beam 442) having the energy exceeding the threshold.

The UE may then determine whether a directional beam corresponding to the alternate subarray is better than the current serving beam. For example, the UE may compare a first value measured for the directional beam selected through beam refinement to a second value measured for the current serving beam to determine whether the other directional beam offers better coherence than the current serving beam. In the context of FIG. 4, the UE 404 may determine whether the directional beam 448 of the set of directional beams 422 is better than the current serving beam 440.

If the other directional beam of the alternate subarray is better than the current serving beam, then the UE may switch to the other directional beam, as illustrated at operation 510. For example, the UE may adjust a beamforming vector to correspond to the other directional beam, and the UE may communicate through the other directional beam. The UE may then return to operation 502 to use the new serving beam. In the context of FIG. 4, the UE 404 may switch to the new directional beam 448 of the first alternate subarray 414.

Figure 6:
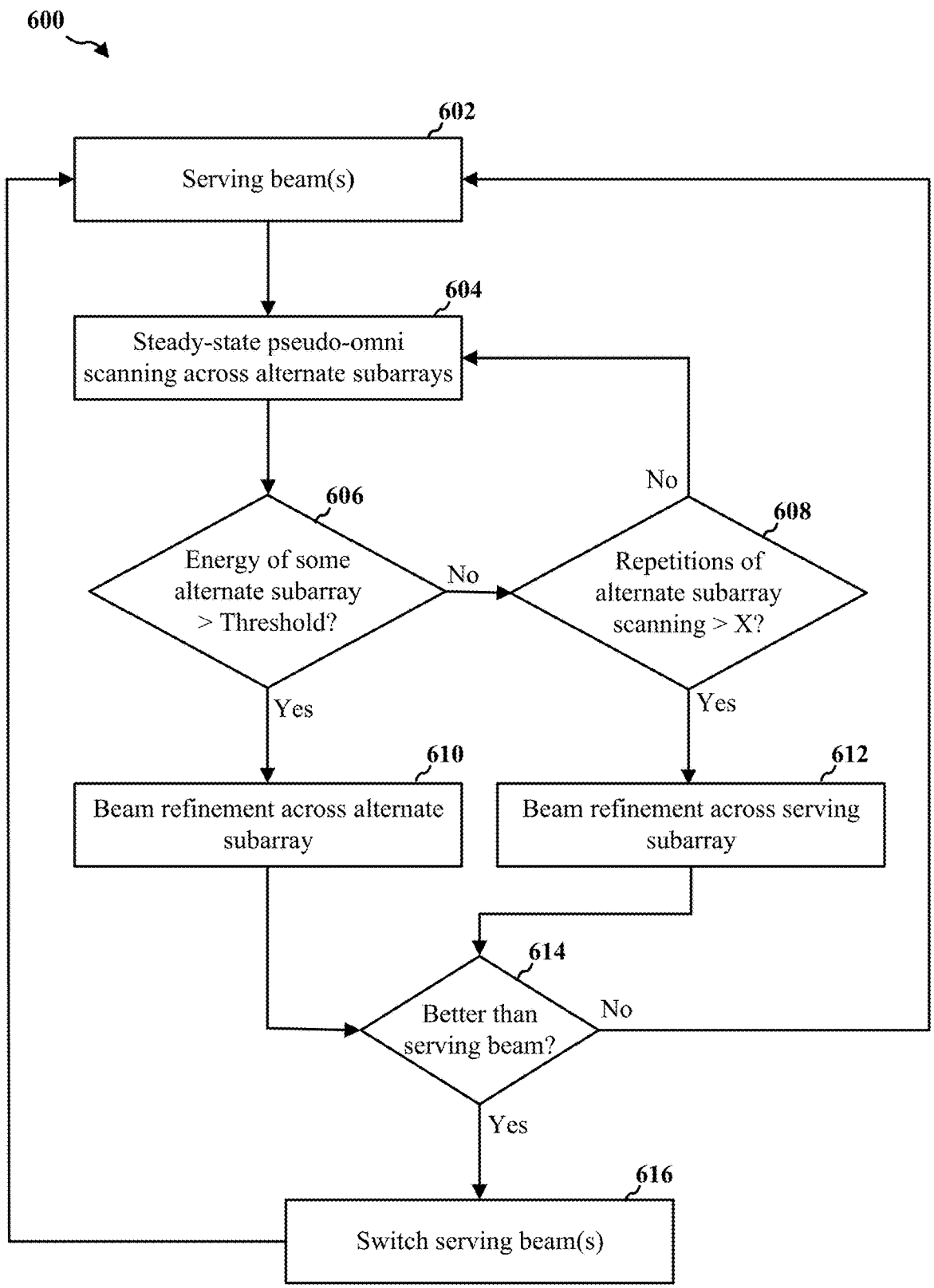
FIG. 6 is a flowchart of a method of wireless communication.

FIG. 6 illustrates a flowchart of a method of wireless communication. The method may be performed by a UE (e.g., the UE 404, the apparatus 802/802'). FIG. 6 may illustrate an approach in which alternate-subarray scanning is prioritized over serving-subarray scanning.

At operation 602, the UE may use one or more serving beams, including at least a current serving beam. For example, the UE may send (and encode) and/or receive (and decode) signals through one or more beams. In the context of FIG. 4, the UE 404 may use the current serving beam 440, for example, to communicate with the base station 402.

At operation 604, the UE may perform alternate-subarray scanning across one or more alternate subarrays, for example, in order to determine the respective energies of one or more pseudo-omni beams of one or more alternate subarrays. For example, the UE may select a pseudo-omni beam of an alternate subarray, and the UE may measure a value indicating energy detected for the selected pseudo-omni beam of the alternate subarray. In the context of FIG. 4, the UE 404 may perform steady-state pseudo-omni scanning across one or more alternate subarrays 414, 416, 418, for example, in order to determine the respective energies of the pseudo-omni beams 442, 444, 446.

At operation 606, the UE may determine whether the energy associated with a pseudo-omni beam corresponding to an alternate subarray exceeds a threshold. For example, the UE may compare a respective value indicating energy to a threshold, and the UE may determine whether the measured value indicating energy satisfies the threshold (e.g., meets or exceeds the threshold). In the context of FIG. 4, the UE 404 may determine whether the energy associated with a pseudo-omni beam (e.g., the first pseudo-omni beam 442) exceeds a threshold.

If the UE determines that the energy associated with one or more pseudo-omni beams across one or more alternate subarrays exceeds a threshold, then the UE may perform beam refinement across the alternate subarray associated with the pseudo-omni beam having the energy exceeding the threshold (e.g., the alternate subarray associated with the pseudo-omni beam having a highest measured value indicating energy), as illustrated at operation 610. For example, the UE may measure a respective value (e.g., an SNR, an SINR, an SNDR, an RSSI, an RSRP, a BRSRP, and/or a BRSRQ) for each directional beam of the alternate subarray, and then select the directional beam of the alternate subarray having the highest or best measured value. In the context of FIG. 4, the UE 404 may perform beam refinement across an alternate subarray (e.g., the first alternate subarray 414) associated with the pseudo-omni beam (e.g., the first pseudo-omni beam 442) having the energy exceeding the threshold.

The UE may then determine whether a directional beam corresponding to the alternate subarray is better than the current serving beam, as illustrated at operation 614. For example, the UE may compare a first value measured for the directional beam selected through beam refinement to a second value measured for the current serving beam to determine whether the other directional beam offers better coherence than the current serving beam. In the context of FIG. 4, the UE 404 may determine whether the directional beam 448 of the set of directional beams 422 is better than the current serving beam 440.

If the other directional beam is better than the current serving beam, then the UE may switch to the other directional beam, as illustrated at operation 616. The UE may then return to operation 602 to use the new serving beam. In the context of FIG. 4, the UE 404 may switch to the new directional beam 448 of the first alternate subarray 414.

If the UE determines that the energy associated with one or more pseudo-omni beams across one or more alternate subarrays does not exceed a threshold, then the UE may determine whether a number of repetitions of alternate-subarray scanning exceeds a repetition threshold X, as illustrated at operation 608. For example, the UE may determine that no other directional beam of an alternate subarray offers better coherence than the current serving beam after a number of repetitions of the alternate-subarray scanning, and the UE may compare the number of times the UE has performed the alternate-subarray scanning to a repetition threshold X. In the context of FIG. 4, the UE 404 may determine whether a number of repetitions of alternate-subarray scanning exceeds a repetition threshold.

If the number of repetitions does not exceed the repetition threshold X, then the UE may return to operation 604 to perform a next repetition of the alternate-subarray scanning. In the context of FIG. 4, the UE 404 may perform another repetition of alternate-subarray scanning.

If the number of repetitions exceeds the repetition threshold X, then the UE may proceed to operation 612. At operation 612, the UE may perform beam refinement across the serving subarray (i.e., serving-subarray scanning). For example, the UE may measure a respective value (e.g., an SNR, an SINR, an SNDR, an RSSI, an RSRP, a BRSRP, and/or a BRSRQ) for each directional beam of the serving subarray, and then select the directional beam of the serving subarray having the highest or best measured value. In the context of FIG. 4, the UE 404 may perform serving-subarray scanning across the serving subarray 412.

At operation 614, the UE may determine whether another directional beam corresponding to the serving subarray is better than the serving beam. For example, the UE may compare a first value measured for another directional beam to a second value measured for the current serving beam to determine whether the other directional beam offers better coherence than the current serving beam. In the context of FIG. 4, the UE 404 may determine whether another directional beam of the set of directional beams 420 is better than the current serving beam 440.

If another directional beam is better than the current serving beam, then the UE may switch to the other directional beam, as illustrated at operation 616. The UE may then return to operation 602 to use the new serving beam. In the context of FIG. 4, the UE 404 may switch to another directional beam of the set of directional beams 420.

If the UE is unable to determine a better serving beam based on directional beam refinement at the serving subarray, the UE may return to operation 602 to continue communicating with the current serving beam. In the context of FIG. 4, the UE 404 may continue to communicate using the current serving beam 440.

Figure 7:
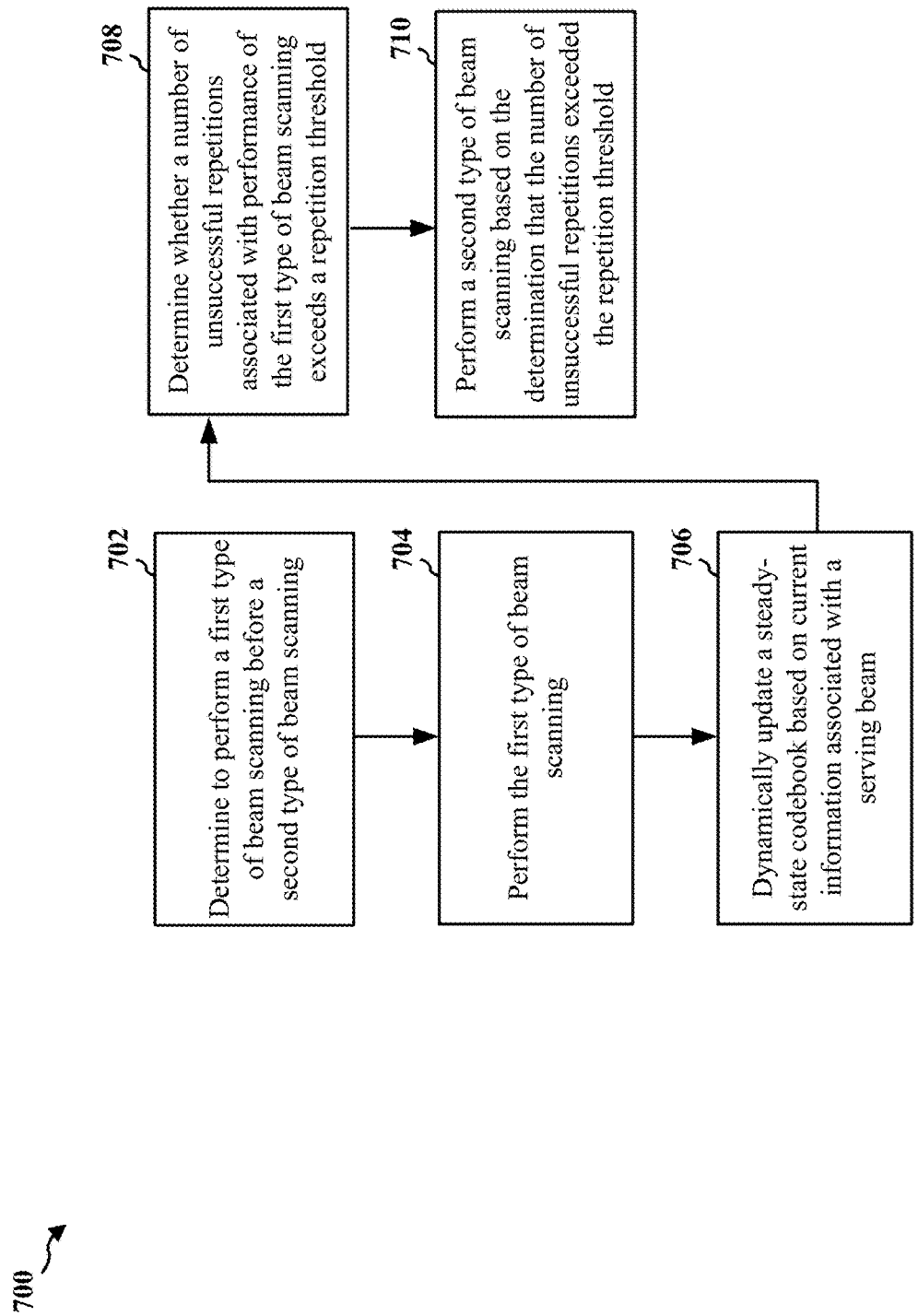
FIG. 7 is a flowchart of a method of wireless communication.

FIG. 7 is a flowchart of a method 700 of wireless communication. The method may be performed by a UE (e.g., the first UE 404, the apparatus 902/902'). At 702, the UE may determine to perform a first type of beam scanning before a second type of beam scanning. For example, the UE may determine one or more timescales (e.g., a first timescale associated with the first type of beam scanning and a second timescale associated with a second type of beam scanning), and prioritize the different types of beam scanning based on the one or more timescales. For example, the UE may determine a first timescale associated with serving-subarray scanning and a second timescale associated with alternate subarray scanning, and the UE may prioritize serving-subarray scanning over alternates-subarray scanning, e.g., when the first timescale is shorter or smaller than the second timescale, or vice versa in other aspects. In the context of FIG. 4, the UE 404 may determine whether to first perform serving-subarray scanning or alternate-subarray scanning.

At operation 704, the UE may perform the first type of beam scanning. For example, the UE may perform serving-subarray scanning or alternate-subarray scanning. In an aspect, the UE may perform the first type of beam scanning based on a codebook. For example, the UE may select beamforming vectors for directional beams of a serving subarray or an alternate subarray based on information indicated in the codebook. In the context of FIG. 4, the UE 404 may perform serving-subarray scanning or alternate-subarray scanning.

For serving-subarray scanning, the UE may measure a respective value (e.g., an SNR, an SINR, an SNDR, an RSSI, an RSRP, a B-RSRP, and/or a B-RSRQ) for each directional beam of the serving subarray, and then determine the directional beam of the serving subarray having the highest or best measured value. The UE may then compare the highest or best measured value to a value measured for the current serving beam (e.g., (e.g., an SNR, an SINR, an SNDR, an RSSI, an RSRP, a B-RSRP, and/or a B-RSRQ). If the directional beam of the serving subarray has better coherence (e.g., a higher or better measured value) than the current serving beam, then the UE may switch to the directional beam. When the UE switches directional beams, the scanning may be considered successful. When the UE does not switch directional beams, the scanning may be considered unsuccessful.

For alternate-subarray scanning, the UE may measure respective values indicating energy for respective pseudo-omni beams of alternate subarrays. When the UE measures a value indicating energy associated with a first pseudo-omni beam that exceeds a threshold and is higher or better than the other measured values indicating energy associated with other pseudo-omni beams, then the UE may perform beam refinement across the alternate subarray corresponding to the first pseudo-omni beam. The UE may measure a respective value (e.g., an SNR, an SINR, an SNDR, an RSSI, an RSRP, a BRSRP, and/or a BRSRQ) for each directional beam of the alternate subarray, and then determine the directional beam of the alternate subarray having the highest or best measured value. The UE may then compare the highest or best measured value to a value measured for the current serving beam (e.g., (e.g., an SNR, an SINR, an SNDR, an RSSI, an RSRP, a BRSRP, and/or a BRSRQ). If the directional beam of the alternate subarray has better coherence (e.g., a higher or better measured value) than the current serving beam, then the UE may switch to the directional beam. When the UE switches directional beams, the scanning may be considered successful. When the UE does not switch directional beams, the scanning may be considered unsuccessful.

At operation 706, the UE may dynamically update a codebook based on current information associated with a serving beam. For example, when the UE performs either the first type of scanning or the second type of scanning, the UE may update one or more beamforming vectors in order to reflect the results of the first type or second type of scanning. By way of example, the UE may add or remove beamforming vectors, e.g., based on whether a measured value associated with a directional beam satisfies a threshold. In the context of FIG. 4, the UE 404 may dynamically update the codebook 410 based on current information associated with the current serving beam 440.

At operation 708, the UE may determine whether a number of repetitions associated with performance of the first type of beam scanning exceeds a repetition threshold. For example, the UE may count a number of unsuccessful repetitions performed for the first type of beam scanning, and the UE may compare the number of unsuccessful repetitions to a repetition threshold X. In the context of FIG. 4, the UE 404 may determine whether a number of unsuccessful repetitions associated with performance of the first type of beam scanning exceeds a repetition threshold.

At operation 710, the UE may perform the second type of beam scanning based on the determination that the number of unsuccessful repetitions exceeded the repetition threshold. In the context of FIG. 4, the UE 404 may perform the second type of beam scanning based on the determination that the number of unsuccessful repetitions exceeded the repetition threshold.

Figure 8:
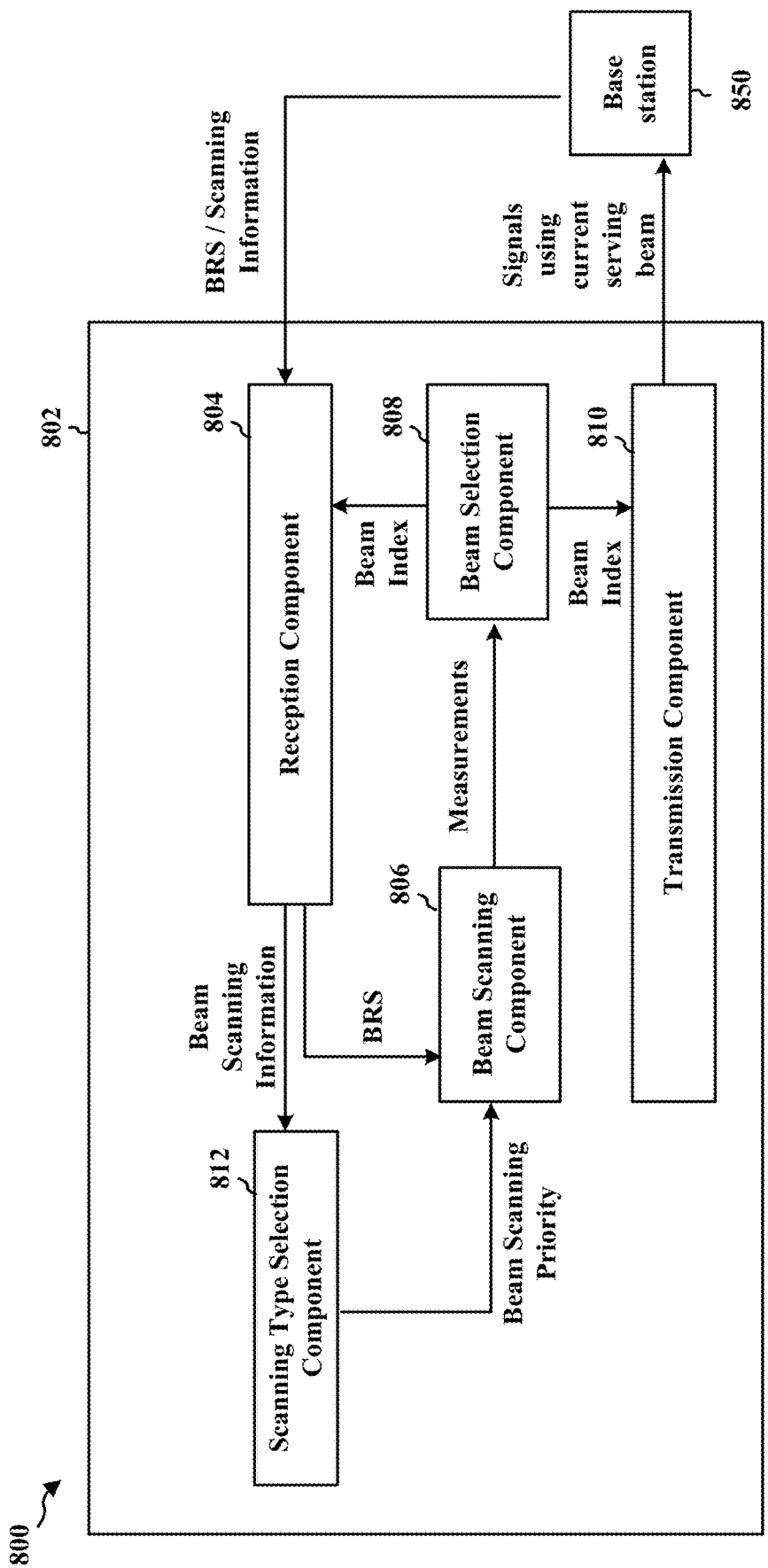
FIG. 8 is a conceptual data flow diagram illustrating the data flow between different means/components in an exemplary apparatus.

FIG. 8 is a conceptual data flow diagram 800 illustrating the data flow between different means/components in an exemplary apparatus 802. The apparatus may be a UE. The apparatus 802 may include a transmission component 810 configured to transmit signals to a base station 850. The apparatus 802 may include a reception component 804 configured to receive signals from a base station 850.

The apparatus 802 may include a scanning type selection component 812. The scanning type selection component 812 may be configured to prioritize a first type of beam scanning over a second type of beam scanning. In an aspect, the scanning type selection component 812 may be configured to determine at least one timescale, and the scanning type selection component 812 may prioritize the first type of beam scanning over the second type of beam scanning based on the at least one time scale. In one aspect, the scanning type selection component 812 may generate the at least one timescale based on beam scanning information received from the base station 850.

The scanning type selection component 812 may provide an indication of the beam scanning priority to a beam scanning component 806. The beam scanning component 806 may be configured to perform the first type of beam scanning before the second type of beam scanning.

In an aspect, the beam scanning component 806 may be configured to determine a repetition threshold (e.g., based on the at least one timescale). The beam scanning component 806 may be configured to perform the first type of beam scanning. The beam scanning component 806 may be configured to determine whether a number of unsuccessful repetitions associated with performance of the first type of beam scanning exceeds a threshold. The beam scanning component 806 may be configured to perform the second type of beam scanning based on the determination that the number of unsuccessful repetitions exceeded the repetition threshold.

In an aspect, the beam scanning component 806 may be configured to measure a first value from the performance of the first type of beam scanning. The first value may be associated with a new serving beam. The beam scanning component 806 may provide the first value to a beam selection component 808.

The beam selection component 808 may be configured to switch to a new serving beam based on a comparison of the first value to a second value that is associated with a current serving beam. The beam selection component 808 may provide an indication of a selected beam index to the transmission component 810 and/or the reception component 804 so that the apparatus 802 may communicate with the base station 850 using the selected beam.

In an aspect, the beam selection component 808 may be configured to dynamically update a codebook based on current information associated with a serving beam.

The apparatus may include additional components that perform each of the blocks of the algorithm in the aforementioned flowcharts of FIGS. 5-7. As such, each block in the aforementioned flowcharts of FIGS. 5-7 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 9:
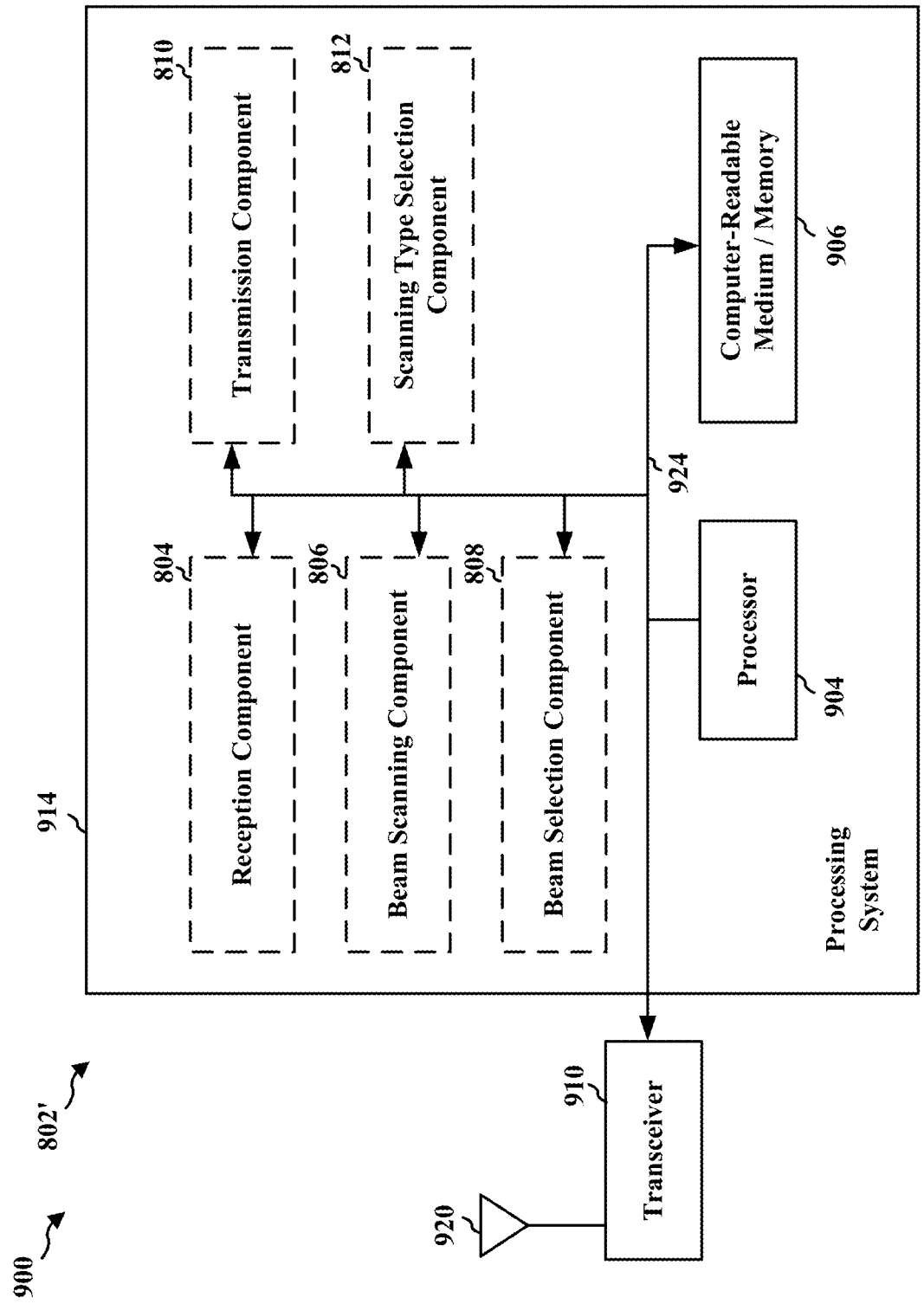
FIG. 9 is a diagram illustrating an example of a hardware implementation for an apparatus employing a processing system.

FIG. 9 is a diagram 900 illustrating an example of a hardware implementation for an apparatus 802' employing a processing system 914. The processing system 914 may be implemented with a bus architecture, represented generally by the bus 924. The bus 924 may include any number of interconnecting buses and bridges depending on the specific application of the processing system 914 and the overall design constraints. The bus 924 links together various circuits including one or more processors and/or hardware components, represented by the processor 904, the components 804, 806, 808, 810, 812 and the computer-readable medium/memory 906. The bus 924 may also link various other circuits such as timing sources, peripherals, voltage regulators, and power management circuits, which are well known in the art, and therefore, will not be described any further.

The processing system 914 may be coupled to a transceiver 910. The transceiver 910 is coupled to one or more antennas 920. The transceiver 910 provides a means for communicating with various other apparatus over a transmission medium. The transceiver 910 receives a signal from the one or more antennas 920, extracts information from the received signal, and provides the extracted information to the processing system 914, specifically the reception component 804. In addition, the transceiver 910 receives information from the processing system 914, specifically the transmission component 810, and based on the received information, generates a signal to be applied to the one or more antennas 920. The processing system 914 includes a processor 904 coupled to a computer-readable medium/memory 906. The processor 904 is responsible for general processing, including the execution of software stored on the computer-readable medium/memory 906. The software, when executed by the processor 904, causes the processing system 914 to perform the various functions described supra for any particular apparatus. The computer-readable medium/memory 906 may also be used for storing data that is manipulated by the processor 904 when executing software. The processing system 914 further includes at least one of the components 804, 806, 808, 810, 812. The components may be software components running in the processor 904, resident/stored in the computer readable medium/memory 906, one or more hardware components coupled to the processor 904, or some combination thereof. The processing system 914 may be a component of the UE 350 and may include the memory 360 and/or at least one of the TX processor 368, the RX processor 356, and the controller/processor 359.

In one configuration, the apparatus 802/802' for wireless communication includes means for determining whether a number of unsuccessful repetitions associated with performance of a first type of beam scanning exceeds a repetition threshold. The apparatus 802/802' may further include means for performing a second type of beam scanning based on the determination that the number of unsuccessful repetitions exceeded the repetition threshold. In an aspect, the performance of the first type of beam scanning and the performance of the second type of beam scanning are based on a codebook. The apparatus 802/802' may further include means for dynamically updating the codebook based on current information associated with a serving beam.

In an aspect, the number of unsuccessful repetitions has not exceeded the repetition threshold, and the apparatus 802/802' further includes means for measuring a first value from the performance of the first type of beam scanning, wherein the first value is associated with a new serving beam. The apparatus 802/802' may further include means for switching to the new serving beam based on a comparison of the first value and a second value which is associated with a current serving beam. In an aspect, the first value and the second value are based on a signal-to-noise ratio (SNR), a signal-to-interference-plus-noise-ratio (SINR), a signal-to-noise-plus-distortion ratio (SNDR), a received signal strength indicator (RSSI), a reference signal received power (RSRP), or a beam reference signal received quality (B-RSRP), or any combination thereof.

The apparatus 802/802' may further include means for determining to perform the first type of beam scanning before the second type of beam scanning. In an aspect, the determination to perform the first type of beam scanning before the second type of beam scanning is based on a timescale associated with the first type of beam scanning. The apparatus 802/802' may further include means for determining the repetition threshold based on the timescale. In an aspect, the timescale is determined based on at least one of a mobility of the UE, an orientation of the mobility of the UE relative to a cluster arrival angle and a carrier frequency, output data from at least one sensor associated with the UE, data from a cloud-based server, or data from a base station. In an aspect, the data from the base station or the data from the cloud-based server includes at least one of a sequence of beams from which the UE determines beam coherence, information about an environment proximate to the UE, or a value associated with the timescale. In an aspect, the first type of beam scanning includes beam refinement using a first set of directional beams associated with a first subarray, the first subarray corresponding to use of a current serving beam, and wherein the second type of beam scanning includes beam scanning using a pseudo-omni beam associated with a second subarray that is different from the first subarray. In an aspect, the first type of beam scanning includes beam scanning using a pseudo-omni beam associated with a second subarray that is different from a first subarray, the first subarray corresponding to use of a current serving beam, and wherein the second type of beam scanning includes beam refinement using a first set of directional beams associated with the first subarray.

The aforementioned means may be one or more of the aforementioned components of the apparatus 802 and/or the processing system 914 of the apparatus 802' configured to perform the functions recited by the aforementioned means. As described supra, the processing system 914 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication by a user equipment (UE), the method comprising:

determining whether a number of unsuccessful repetitions associated with performance of a first type of beam scanning exceeds a repetition threshold; and
performing a second type of beam scanning based on the determination that the number of unsuccessful repetitions exceeded the repetition threshold, wherein the first type of beam scanning includes beam scanning using a flat gain beam or pseudo-omni beam associated with a plurality of subarrays that are different from a first subarray, the first subarray corresponding to use of a current serving beam, and wherein the second type of beam scanning includes beam refinement using a set of directional beams associated with the first subarray.

2. The method of claim 1, wherein the performance of the first type of beam scanning and the performance of the second type of beam scanning are based on a codebook.

3. The method of claim 2, further comprising:
dynamically updating the codebook based on current information associated with a serving beam.

4. The method of claim 1, wherein when the number of unsuccessful repetitions has not exceeded the repetition threshold, and the method further comprising:
measuring a first value from the performance of the first type of beam scanning, wherein the first value is associated with a new serving beam; and
switching to the new serving beam based on a comparison of the first value and a second value which is associated with a current serving beam.

5. The method of claim 4, wherein the first value and the second value are based on a signal-to-noise ratio (SNR), a signal-to-interference-and-noise-ratio (SINR), a signal-to-noise-plus-distortion ratio (SNDR), a received signal strength indicator (RSSI), a reference signal received power (RSRP), or a reference signal received quality (RSRQ), or any combination thereof.

6. The method of claim 1, further comprising:
determining to perform the first type of beam scanning before the second type of beam scanning.

7. The method of claim 6, wherein the determination to perform the first type of beam scanning before the second type of beam scanning is based on a timescale associated with the first type of beam scanning and changes in channel conditions as observed by the UE.

8. The method of claim 7, further comprising:
determining the repetition threshold based on the timescale and channel conditions.

9. The method of claim 7, wherein the timescale is determined based on at least one of a mobility of the UE, an orientation of the mobility of the UE relative to a cluster arrival angle and a carrier frequency, output data from at least one sensor associated with the UE, blockage or fading conditions as observed by the UE, data from a cloud-based server, or data from a base station.

10. The method of claim 9, wherein the data from the base station or the data from the cloud-based server includes at least one of a sequence of beams from which the UE determines beam coherence, information about an environment proximate to the UE, or a value associated with the timescale.

11. A method of wireless communication by a user equipment (UE), the method comprising:
determining whether a number of unsuccessful repetitions associated with performance of a first type of beam scanning exceeds a repetition threshold; and
performing a second type of beam scanning based on the determination that the number of unsuccessful repetitions exceeded the repetition threshold, wherein the first type of beam scanning includes beam refinement using a first set of directional beams associated with a first subarray, the first subarray corresponding to use of a current serving beam, and wherein the second type of beam scanning includes beam scanning using a flat gain beam or pseudo-omni beam associated with a plurality of subarrays that are different from the first subarray.

12. The method of claim 11, wherein the performance of the first type of beam scanning and the performance of the second type of beam scanning are based on a codebook.

13. The method of claim 12, further comprising:
dynamically updating the codebook based on current information associated with a serving beam.

14. The method of claim 11, wherein when the number of unsuccessful repetitions has not exceeded the repetition threshold, and the method further comprising:
measuring a first value from the performance of the first type of beam scanning, wherein the first value is associated with a new serving beam; and
switching to the new serving beam based on a comparison of the first value and a second value which is associated with a current serving beam.

15. The method of claim 14, wherein the first value and the second value are based on a signal-to-noise ratio (SNR), a signal-to-interference-and-noise-ratio (SINR), a signal-to-noise-plus-distortion ratio (SNDR), a received signal strength indicator (RSSI), a reference signal received power (RSRP), or reference signal received quality (RSRQ), or any combination thereof.

16. The method of claim 11, further comprising:
determining to perform the first type of beam scanning before the second type of beam scanning and changes in channel conditions as observed by the UE.

17. The method of claim 16, wherein the determination to perform the first type of beam scanning before the second type of beam scanning is based on a timescale associated with the first type of beam scanning and channel conditions.

18. The method of claim 17, further comprising:
determining the repetition threshold based on the timescale.

19. The method of claim 17, wherein the timescale is determined based on at least one of a mobility of the UE, an orientation of the mobility of the UE relative to a cluster arrival angle and a carrier frequency, output data from at least one sensor associated with the UE, blockage or fading conditions as observed by the UE, data from a cloud-based server, or data from a base station.

20. The method of claim 19, wherein the data from the base station or the data from the cloud-based server includes at least one of a sequence of beams from which the UE determines beam coherence, information about an environment proximate to the UE, or a value associated with the timescale.

21. An apparatus for wireless communication, comprising:
a transceiver;
a memory configured to store instructions; and
one or more processors communicatively coupled with the transceiver and the memory, wherein the one or more processors are configured to:
determine whether a number of unsuccessful repetitions associated with performance of a first type of beam scanning exceeds a repetition threshold; and
perform a second type of beam scanning based on the determination that the number of unsuccessful repetitions exceeded the repetition threshold, wherein the first type of beam scanning includes beam scanning using a flat gain beam or pseudo-omni beam associated with a plurality of subarrays that are different from a first subarray, the first subarray corresponding to use of a current serving beam, and wherein the second type of beam scanning includes beam refinement using a set of directional beams associated with the first subarray.

22. The apparatus of claim 21, wherein the performance of the first type of beam scanning and the performance of the second type of beam scanning are based on a codebook.

23. The apparatus of claim 22, wherein the one or more processors is further configured to dynamically update the codebook based on current information associated with a serving beam.

24. The apparatus of claim 21, wherein when the number of unsuccessful repetitions has not exceeded the repetition threshold, and the one or more processors is further configured to:
measure a first value from the performance of the first type of beam scanning, wherein the first value is associated with a new serving beam; and
switch to the new serving beam based on a comparison of the first value and a second value which is associated with a current serving beam.

25. The apparatus of claim 24, wherein the first value and the second value are based on a signal-to-noise ratio (SNR), a signal-to-interference-and-noise-ratio (SINR), a signal-to-noise-plus-distortion ratio (SNDR), a received signal strength indicator (RSSI), a reference signal received power (RSRP), or a reference signal received quality (RSRQ), or any combination thereof.

26. The apparatus of claim 21, wherein the one or more processors is further configured to determine to perform the first type of beam scanning before the second type of beam scanning.

27. The apparatus of claim 26, wherein the determination to perform the first type of beam scanning before the second type of beam scanning is based on a timescale associated with the first type of beam scanning and changes in channel conditions as observed by the UE.

28. The apparatus of claim 27, wherein the one or more processors is further configured to determine the repetition threshold based on the timescale and channel conditions.

29. The apparatus of claim 27, wherein the timescale is determined based on at least one of a mobility of the UE, an orientation of the mobility of the UE relative to a cluster arrival angle and a carrier frequency, output data from at least one sensor associated with the UE, blockage or fading conditions as observed by the UE, data from a cloud-based server, or data from a base station.

30. The apparatus of claim 29, wherein the data from the base station or the data from the cloud-based server includes at least one of a sequence of beams from which the UE determines beam coherence, information about an environment proximate to the UE, or a value associated with the timescale.

31. An apparatus for wireless communication, comprising:
a transceiver;
a memory configured to store instructions; and
one or more processors communicatively coupled with the transceiver and the memory, wherein the one or more processors are configured to:

determine whether a number of unsuccessful repetitions associated with performance of a first type of beam scanning exceeds a repetition threshold; and
perform a second type of beam scanning based on the determination that the number of unsuccessful repetitions exceeded the repetition threshold, wherein the first type of beam scanning includes beam refinement using a first set of directional beams associated with a first subarray, the first subarray corresponding to use of a current serving beam, and wherein the second type of beam scanning includes beam scanning using a flat gain beam or pseudo-omni beam associated with a plurality of subarrays that are different from the first subarray.

32. The apparatus of claim 31, wherein the performance of the first type of beam scanning and the performance of the second type of beam scanning are based on a codebook.

33. The apparatus of claim 32, wherein the one or more processors is further configured to dynamically update the codebook based on current information associated with a serving beam.

34. The apparatus of claim 31, wherein when the number of unsuccessful repetitions has not exceeded the repetition threshold, and the one or more processors is further configured to:
measure a first value from the performance of the first type of beam scanning, wherein the first value is associated with a new serving beam; and
switch to the new serving beam based on a comparison of the first value and a second value which is associated with a current serving beam.

35. The apparatus of claim 34, wherein the first value and the second value are based on a signal-to-noise ratio (SNR), a signal-to-interference-and-noise-ratio (SINR), a signal-to-noise-plus-distortion ratio (SNDR), a received signal strength indicator (RSSI), a reference signal received power (RSRP), or reference signal received quality (RSRQ), or any combination thereof.

36. The apparatus of claim 31, wherein the one or more processors is further configured to determine to perform the first type of beam scanning before the second type of beam scanning and changes in channel conditions as observed by the UE.

37. The apparatus of claim 36, wherein the determination to perform the first type of beam scanning before the second type of beam scanning is based on a timescale associated with the first type of beam scanning and channel conditions.

38. The apparatus of claim 37, wherein the one or more processors is further configured to determine the repetition threshold based on the timescale.

39. The apparatus of claim 37, wherein the timescale is determined based on at least one of a mobility of the UE, an orientation of the mobility of the UE relative to a cluster arrival angle and a carrier frequency, output data from at least one sensor associated with the UE, blockage or fading conditions as observed by the UE, data from a cloud-based server, or data from a base station.

40. The apparatus of claim 39, wherein the data from the base station or the data from the cloud-based server includes at least one of a sequence of beams from which the UE determines beam coherence, information about an environment proximate to the UE, or a value associated with the timescale.

* * * * *